Figure 1:
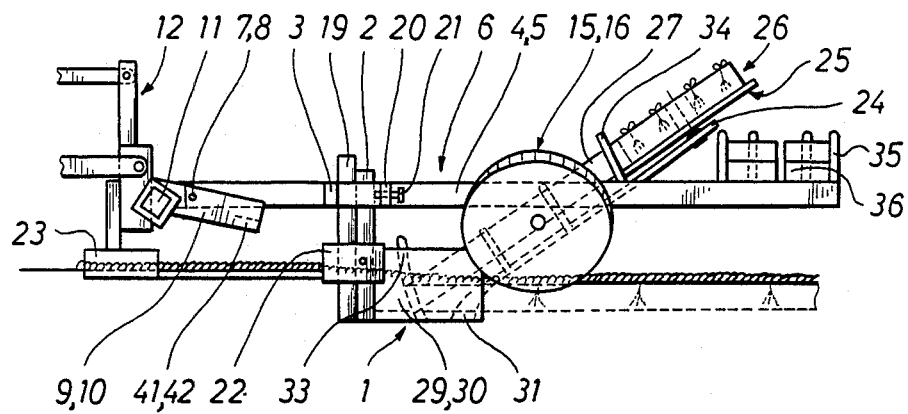

United States Patent [19]

Ahm

[11] Patent Number: 4,829,915
[45] Date of Patent: May 16, 1989

[54] APPARATUS FOR TRANSPLANTING TAPES CONTAINING PLANTS

[75] Inventor: Poul H. Ahm, Las Palmas, Spain

[73] Assignee: Bentle Products AG, Zug, Switzerland

[21] Appl. No.: 910,956

[22] Filed: Sep. 24, 1986

[30] Foreign Application Priority Data

Sep. 24, 1985 [DK] Denmark .................. 4321/85

[51] Int. Cl.⁴ ............................................. A01C 11/02
[52] U.S. Cl. ................................. 111/105; 405/176
[58] Field of Search .............. 111/2, 3, 86, 1; 47/56; 405/176

[56] References Cited

U.S. PATENT DOCUMENTS

| | | | |
|---|---|---|---|
| 1,252,668 | 1/1918 | Crawford | 111/3 |
| 2,571,491 | 10/1951 | Schindler | 47/56 |
| 3,261,310 | 7/1966 | Cronk et al. | 111/3 |
| 3,327,484 | 6/1967 | Launder et al. | 405/176 |
| 3,757,529 | 9/1973 | Kaercher | 405/176 |
| 4,253,411 | 3/1981 | Sbulzhenko et al. | 111/2 |

FOREIGN PATENT DOCUMENTS

| | | | |
|---|---|---|---|
| 2122318 | 11/1972 | Fed. Rep. of Germany | 111/3 |
| 3012980 | 10/1981 | Fed. Rep. of Germany | 405/176 |
| 1108308 | 1/1956 | France | 111/3 |
| 2441997 | 6/1980 | France | 111/3 |
| 36258 | 11/1922 | Norway | 111/86 |

*Primary Examiner*—James R. Feyrer
*Attorney, Agent, or Firm*—Cooper & Dunham

[57] ABSTRACT

An apparatus for transplanting the tape comprises a share (1) for providing a slot opening in the soil, a holding device (24, 25) for one or several packages (26) of tape (27), and elevationally adjusting members, leading members and guide members (33, 34) for the tape, as well as members (15, 16) for pushing together and pressing down the soil around the tape. The share (1) is substantially V-shaped, open to the rear and preferably elevationally adjustable. The guide member (33) is an obliquely forwardly turned guide rod (33) rising from the share (1) or one or several inclined rollers. The holding device (24, 25) comprises a plate-shaped substratum (25) for the package. The elevationally adjusting members are members for adjusting the course of the tape, in particular its angle position, in relation to the guide member (33). The leading means leads the tape from the package to its contact with the guide member (33). The members (15, 16) for pushing together and pressing down the soil around the tape are located behind the guide member (33).

1 Claim, 4 Drawing Sheets

APPARATUS FOR TRANSPLANTING TAPES CONTAINING PLANTS

The present invention relates to a method of continuous automatic transplanting in the soil of a tape folded or rolled up to form a package and containing plants, seedlings or viable plant materials with the plants vertically oriented and placed at a desired level in the soil, and where the placing of the tape in the soil is effected by a pulling movement or by controlled delivery from the package, the tape being pulled off or delivered from the package, while said package is transported across the ground, and the tape is placed upright in a simultaneously formed narrow, substantially vertical slot opening in the soil, while the part of the tape already transplanted into the soil is maintained by the soil pushed together against said tape from both sides.

U.S. Pat. No. 1,750,054 discloses an apparatus for carrying out a similar method, wherein the tape in rolled up shapes is suspended on a horizontal axle journal in front of and above the spot, where a furrow is formed in the soil, and where the tape is pulled directly from the roll and down into the furrow through an opening in the upper side of a narrow and hollow furrow runner having a reversed U-shaped cross-sectional profile. The furrow runner is consequently open at the bottom, and the height of the side-webs and their interspacing are thus only somewhat greater than the dimensions of the tape, so that the position of the tape is guided laterally as well as elevationally by the furrow runner. During the pulling off of the tape from the roll and down through the furrow runner the tape is turned 90° from a position, in which the plants are horizontally oriented, to a position, in which they are vertically oriented. When the tape is pulled through the furrow runner and out into the soil, its upper edge will be pressed against the upper side of the furrow runner with an essential risk of damaging the plants, the tops of which extend beyond the tape. Besides there is no kind of protection or guidance of the rolled up tape or of the plants therein. A scraper for scraping together the soil around the tape in the furrow is provided on the rear end of the furrow runner.

The object of the present invention is to provide a method of the kind stated above, by means of which it is possible with a very modest performance and power consumption to transplant the tape in a particularly quick, reliable, exact and consequently inexpensive manner and in a manner extremely lenient for the plants.

The method according to the invention is characterised by placing one or several packages with the root side resting on a substratum, said substratum transporting the packages across the ground, optionally in such a manner that the plant tapes are connected end to end, and conducting the tape from the package or packages down around a guide member, which may consist of a guide rod pointing obliquely upward and forward from the bottom of the slot-opening or of one or several inclined rollers, and then backward into the slot-opening formed in the soil, the elevational location of the tape in the soil being adjusted by a corresponding adjustment of the elevational location of the guide member in the soil, and by an adjustment of the guidance of the tape around the guide member, and by subsequently closing immediately behind the guide member the opening around the tape by means of a combined pushing together of the soil from both sides of the tape and compression of the soil around the tape. Essential advantages are consequently obtained compared to the known method. It is thus easy to place the package of tapes resting on a substratum, and in this position the tape is exposed to the least possible strain during transplanting. The roots are simultaneously well protected against drying out, so that the plants last longer and grow more reliably. Furthermore, the tape can more easily be led through the apparatus and out into the opening in the soil; a very exact, reliable and correct placing in the soil of the tape is obtained in a manner most lenient for the plants by means of said leading and elevational guidance, so that the plants are not exposed to elevational adjusting members, which touch the upper side of the tape containing the plant tops. In all this implicates that the transplanting can be effected so quickly, inexpensively and reliably as to be competitive compared to mechanical sowing.

The conduction of the adjustment of the guidance of the tape around the guide member can according to the invention advantageously be performed quite simply by adjusting the angle, under which the tape is directed down around the guide member, and preferably in such a manner that the lower edge of the tape will be immediately above the bottom of the opening, and that the upper edge of the tape is simultaneously only just covered with soil.

In order to avoid unadvantageous leadings of the tape in lateral direction due to heavy gales during the transplanting the tape may be guided in lateral direction on the path between the package and the guide member, e.g. by means of lateral control.

Furthermore the closing of the opening and the compression of the soil may advantageously be adapted to the current soil conditions by changing the location and adjustment of the members used for the closing and the compression of the soil compared to the guide member and the tape, and by changing the load on these members. Under all normally occurring soil conditions it will consequently be possible to ensure a good covering of the tape and a good contact between the plant roots and the soil.

In order to counteract an optional tendency of ruptures on the plant tape due to sudden jerks during the transplanting an equalization is performed of the variations of tensile stress occurring in the tape during the pulling off of the tape or delivery from the package by means of at least one member which is elastic and resilient in connection with tensile stresses in the tape beyond a preadjusted size, such as an elastic displaceable guide member or an elastic displaceable slide with a guide member mounted thereon.

When the holding device is elevationally adjustable compared to the share it is particularly easy to change the angle under which the tape is led down to the share and thus the guide member and it is consequently easy to adjust the elevational location of the tape in relation to the share exactly.

The invention further relates to an apparatus for transplanting in the soil of a tape rolled up or folded to form one or several packages and containing plants, seedlings or viable plant materials with the plants vertically oriented and placed at a desired level, and of the kind comprising a share for forming a narrow slot opening in the soil, a holding device for one or several packages of the tape and members for adjusting the elevational location, the leading and the guidance of the tape, and members for pushing together the soil around the tape in the opening; said apparatus is characterised in that the share is a substantially V-shaped share open to the rear and optionally coupled to one or several lead-shares, optionally of a variable V-shape and preferably elevationally adjustable, and comprising a tape guide member, such as a guide rod located above the bottom of the share and pointing obliquely forward and upward or one or several inclined rollers, and wherein the holding device comprises a plateshaped substratum for the package or a magazine of substrata for the packages, and wherein the elevationally adjusting members consist of members for adjusting the course of the tape compared to the guide member, preferably by adjusting the angle, under which the tape is directed down around the guide member, and in which the members for pushing together the soil around the tape are besides adapted to compress the soil around the tape and are located behind the guide member, preferably symmetrically around the tape in the soil, whereby the leading members comprise members for leading the tape from its pulling off or delivery from the package to its contact with the guide member As a result a particularly simple, inexpensive and reliable apparatus is achieved with very few movable parts and enabling an exact, quick and lenient transplanting of the plant tape. Tests with a prototype apparatus have thus shown that transplanting rates of above 10 km/h are not unrealistic, even with a great number of transplanting apparatuses mounted in side by side relation behind a tractor and with the tractor driver as the only operator. Filling of the apparatus with a new package containing a length of 600–1000 m tape can be performed within 30 seconds per package.

In an apparatus for use in connection with a package of a rolled-up tape the holding device for the individual package could advantageously consist of a rotatable disc located on a frame and comprising a centrally located upright guide spindle for a roll. As a result the pulling off of the tape, which is effected by a simultaneously caused rotational movement of the disc with the package, takes place under low tensions in the tape and with a smooth movement and with a pulling off of the tape from substantially the same direction all the time or in an only slightly changed direction. It will simultaneously be easy to release the tape from the roll, and normally only a single layer of tape can be unrolled at a time corresponding to the rolling up. Situations could, however occur, where several tapes could be rolled up on and pulled off from the same roll for transplanting several very close rows.

In order to adjust the elevational location of the tape in the share the holding device may according to the invention be elevationally adjustable compared to the share.

The share and the holding device may furthermore be rigidly interconnected, and if so the angle, which the tape forms with the guide rod during the leading down of the tape around the guide rod, will be of the same magnitude as, but opposite the angle which the tape forms with the guide rod when leaving said guide rod with its lower edge at the bottom of the opening, according to the principle "angle of incidence=angle of reflection".

The holding device could be located behind and above the share, and the leading members will then comprise a carrying member extending from the holding device down towards the guide member and containing lateral guide elements for lateral guidance of the tape, such as guide rods rising from the carrying member on each side of the tape. This location of the packages on the holding device will be the most convenient and will simultaneously ensure a smooth course of the tape, even during the influence of a strong side wind.

The holding device is, however, according to the invention preferably located in front of, next to, or behind and/or above the share, and then the leading members may comprise directional reversing members for the tape, such as one or several reversing rods or reversing rollers as well as a carrying member extending from said rollers down towards the guide member, and containing lateral guide elements for lateral guidance of the tape, such as guide rollers rising from the carrying member on each side of the tape, said construction being the normally preferred construction.

The share according to the invention may preferably comprise two V-positioned side walls and a connecting bottom wall together defining a substantially V-shaped slot open to the rear, where the foremost pointed part of the share is a separate sword-shaped part vertically adjustable compared to the remaining part of the share A particularly slim construction of the share is thus provided with a subsequent small power consumption, as only small amounts of soil will have to be removed. This measure permits an elevational downward displacement of the sword as it is worn.

The apparatus may further be adapted for elevationally adjustable suspension on a frame capable of being suspended in a manner known per se in the three-point suspension of a tractor or on wheels or similar suspension members. An easy elevational adjustment of the apparatus is thus obtained, also briefly during operation.

The members for pushing together and compressing the soil around the tape could be comprised by two pressure wheels suspended on axle journals, the orientation of which is adjustable in such a manner that the wheels can be adjusted to taper downward and forward or backward and can furthermore be displaced in parallel towards or away from the guide member and in upward and downward direction. Good possibilities are thus provided of controlling at any time the compression of the soil around the tape in the manner desired, and the soil can also lock the tape in vertical position and at the correct level immediately after having left the rear end of the share.

According to a preferred embodiment of the inventive apparatus the guide member may be rod-shaped, preferably with corrugated and/or rotatable surface elements, such as rotatable rollers or collars, which has turned out to be a practical and simple construction. Many other constructions of the guide member are possible; it could thus be composed of part of the side walls of the share, e.g. in the form of an edge-forming slot in one of the side walls, the rear part of which could then be displaced towards the centre of the V-shaped slot in the share to protect the tape. The rod-shaped guide member may furthermore advantageously be fastened in the base of the share, e.g. by being screwed into and/or welded into said base.

It has in practice turned out to be advantageous to utilize a polished stainless steel tube with a p diameter of 8–12 mm, which is screwed into the base and then welded firmly to the upper side as well as to the lower side of the base. It has further turned out to be practical to bent back the upper part of the guide member to some extent to facilitate the descending of the tape around said guide member.

In a particularly advantageous embodiment according to the invention the guide member is fastened to separarate displaceable means, such as a slide, which is fastened smooth running and displaceably in forward and backward direction to the share, and which is elastically pre stressed in forward direction compared to the share. As a result the tensions arising in the tape e.g. by suddenly arising forward jerks in the apparatus can partly be equalized by the fact that the slide with the guide member can then yield and be resilient to some extent in backward direction. The slide with the guide member will then again be pulled forward in relation to the share, when the tension in the tape again drops to normal.

In this connection the separate means with the guide member may be positioned at the bottom of the share, and the spring may be constructed as a tension spring suspended at the front end of the share. However, it might also be positioned at the top of the share and a particularly advantageous embodiment can then be obtained when the separate means is suspended at the top of the side walls of said share, and in that the guide member is mounted pivotally on the separate means around a horizontal axle journal positioned transversely to its direction of displacement together with a control rod for the guide member in such a manner that said guide member is tiltable by means of the control rod between a position of operation, in which it extends obliquely downwards and backwards compared to its suspension point, and a position of load, in which its bottom end is turned backwards and upwards compared to the suspension point, and where locking means capable of locking the guide member releasably in the desired position of operation are connected with the guide member and/or the control rod. As a result the share can be closed at the top, so that the soil ploughed up by the share cannot drop down into the interior of the share to the inconvenience of the leading of the tape, and the access to insertion of the tape is facilitated in the special position of load, in which the tape in loop-form can be led in under and around the guide member substantially behind the side walls of the share and then be led to the position of operation between the side walls of the share by means of the tilting movement of the share. The separate means with the guide member could, however, also be journalled in flat springs being yieldable in backward direction, thereby eliminating a tendency of the springs being blocked by soil.

A substantially U-shaped stop member for the tape mounted on the free end of the guide member can ensure that the tape does not run off the end of the guide member. The locking means for the guide member/control rod may be of any usable known art.

Figure 2:
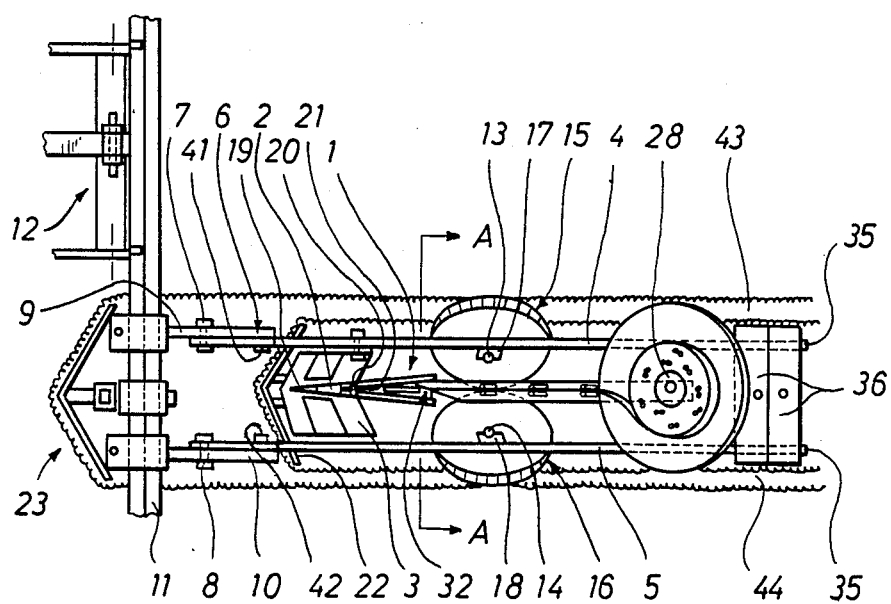
Figure 3:
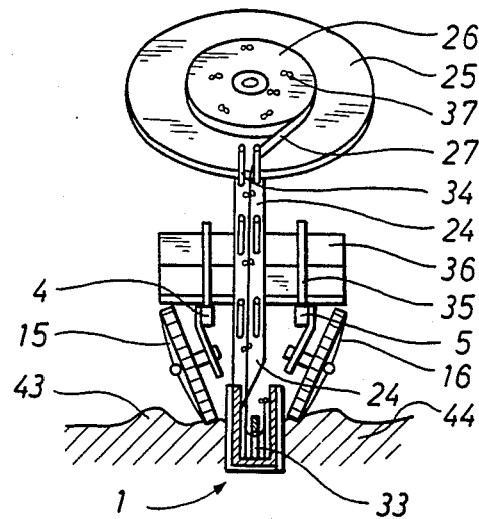
Figure 4:
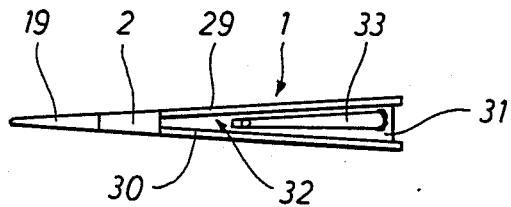
Figure 5:
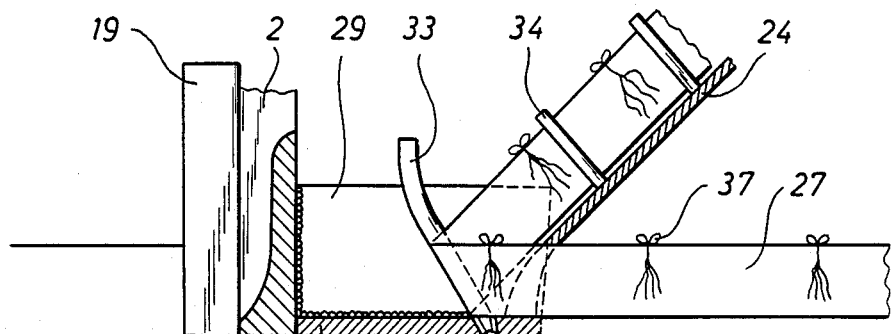
Figure 6:
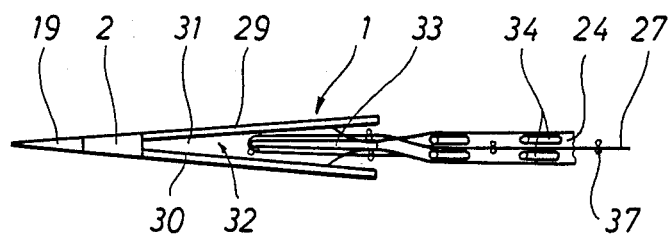
Figure 7:
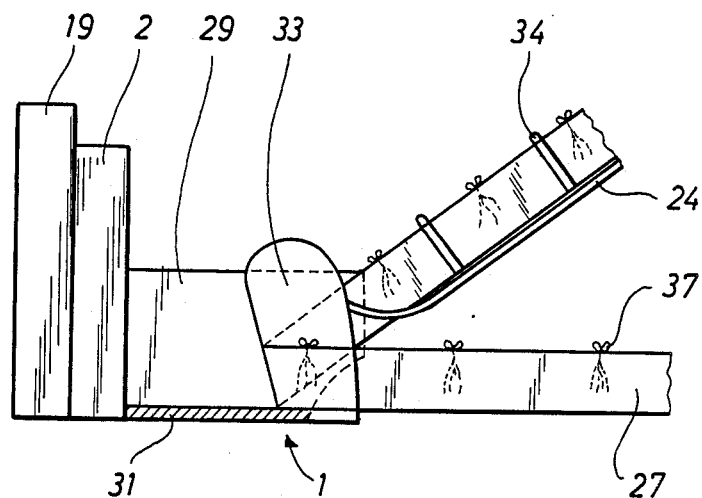

The invention will be described below with reference to the accompanying drawing, in which FIG. 1 is a side view of a preferred embodiment of the apparatus according to the invention, FIG. 2 is a top view of the preferred embodiment of FIG. 1, FIG. 3 is a sectional view along the line A—A of FIG. 2, FIG. 4 is a top view of a section of FIG. 2 illustrating the share at a larger scale, FIG. 5 is a partly intersected side view of the share of FIG. 4, FIG. 6 is a top view of an alternative embodiment of the share according to the invention, and FIG. 7 is a part sectional side view of the alternative embodiment of FIG. 6.

Figure 8:
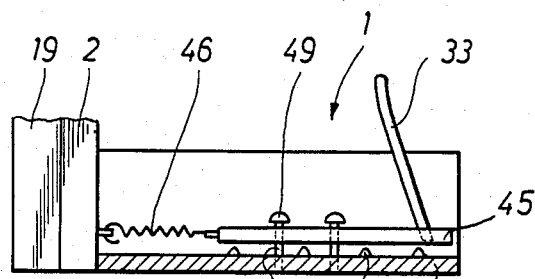
Figure 9:
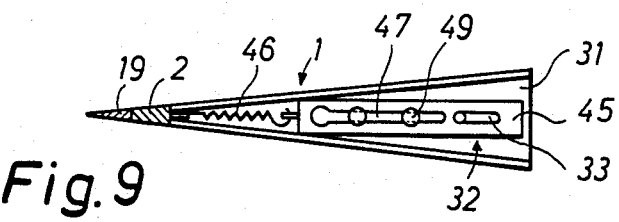

FIGS. 8-9 are a sectional side view and top view, respectively, of an embodiment of the share with a slide separately and resiliently suspended at the bottom of the share and comprising a guide member mounted thereon, FIGS. 10-13 are a sectional side view and rear view, respectively, of another embodiment of the share comprising a slide separately and resiliently suspended at the top of the share and with a pivotally mounted guide member with a guide rod, the figures are illustrated with and without the slide mounted thereon.

FIGS. 1-5 illustrate a preferred embodiment of the apparatus according to the invention. The apparatus consists of a slim V-shaped share 1, which by means of a mounting rod 2 is suspended vertically adjustable in a bridge 3 between two parallel side members 4, 5 belonging to a frame 6, which is pivotally suspended at one end around two link bolts 7, 8 mounted in two carrier arms 9, 10, which are rigidly connected to a tension rod which is in turn rigidly connected to the three-point suspension 12 of a tractor (not shown). On the side of the mounting rod 2 opposite the three-point suspension the two side members 4, 5 of the frame 6 are supported on an axle journal 13, 14 each associated with a pressure wheel 15, 16 by means of two brackets 17, 18 fastened to the side members 4, 5. In front of the mounting rod 2 on the share 1 in the bridge 3 a sword 19 is mounted turning its pointed end forward and forming the cutting edge of the share 1. The mounting rod 2 and the sword 19 are maintained in the bridge 3 by means of a screw 21 screwed through the rear edge 20 of the bridge. A plough-shaped, vertically adjustable lead-share 22 is further mounted on the mounting rod 2 in front of the sword 19 and projecting to both sides of said sword, and a vertically adjustable plough-shaped lead-share 23 is mounted on the tension rod 11. A carrying member 24 for a holding device 25 for a rolled-up package 26 of tape 27 is fastened to the share 1 and extends backward and obliquely upward therefrom. The holding device 25 consists of a rotatable disc with a guide spindle 28 projecting perpendicularly therefrom, and the rolled-up package 26 of tape 27 is placed around said guide spindle. The share 1 comprises two vertical side walls 29, 30 welded to a side each of the mounting rod 2. Together with a connecting bottom wall 31 the side walls 29, 30 form a V-shaped slot 32 in the share 1, said slot 32 opening to the rear. An obliquely upward and forward pointing guide member 33 for the tape in the form of a guide rod 33 is mounted in the bottom wall 31. The guide rod 33 consisting of polished stainless steal is screwed into a threaded hole in the bottom wall 31 and subsequently welded to the upper side as well as to the lower side of the bottom wall 31. Between the holding device 25 and the share 1 the carrying member 24 is provided with interspaced lateral guides 34 for the tape 27 arranged in pairs above each other in the form of plastics pins or rollers 34. The pressure wheels 15, 16 are mounted so as to taper downward and are adjustable to taper forward or 35 for load scales 36. When using the apparatus for transplanting tapes 27 with plants 37, a package 26 of tape 27 is placed around the guide spindle on the rotatable disc 25, and the outer end of the tape 27 is pulled off the package 26 and led in between the guide pins or rollers 34, and around the guide rod 33 in the V-shaped slot 32 in the share 1 and subsequently backward through the slot 32 and a small distance beyond its rear edge. The apparatus is now pulled forward by the tractor during simultaneous lowering of the three-point suspension 12 to such an extent that the lead-shares 22, 23 level the soil in front of the share 1, and said share is lowered into the soil until it forms a slot opening of the desired depth in the soil viz. corresponding to the height of the tape 27 to be transplanted. When the apparatus is pulled forward the share 1 will produce the slot opening making room for the tape immediately behind the rear edge of the share 1, and the pressure wheels 15, 16 will push and press back the soil moved by the share when producing the slot opening and thus cover the tape 27 from both sides thereof, so that when only just covered with the plants vertically oriented it will be retained by the soil. At the further propulsion of the apparatus the tape 27 will be pulled off the package 26 thus making the disc 25 rotate. The adjustment of the tape at the correct level in the soil is performed by changing the inclination of the carrying member 24, in relation to the horizontal plane, so that the angle, which the longitudinal axis of the tape 27 forms with the guide rod 33, is equal to and opposite the angle, which the guide rod forms with the surface of the ground. These angles may also be adjusted to a smaller extent by a smaller change of the inclination of the guide rod. In order to facilitate the mounting of the tape 27 around the guide rod 33, the upper end of said guide rod may be bent slightly backward as illustrated in FIG. 1. When not in use the apparatus may be lifted above the ground by means of the hydraulics of the tractor, as the frame 6—when the tension rod 11 is lifted above a certain level—will also be lifted by means of two carrier cams 41, 42 on the lower side of the carrier arms 9, 10. The guide pins or rollers 34 serve to guide the tape in lateral direction in case of strong wind, and the guide pins or rollers 34 located adjacent the disc 25 furthermore serve to ensure a more smooth, uniform pulling off of the tape from the package 26. Experience has shown that the tested plant tapes could be transplanted without any problems at a rate of up to 10 km/h. If the tractor is suddenly stopped when at full speed, the disc will admittedly rotate approximately 180° further around, but will then stop when the outer side of the unwound part of the moist tape lies against the part of the tape, which is not unrolled, and at renewed start the tape will again be unrolled without any problems.

FIG. 4 is a top view of a detail of the share 1, from which it appears that the guide rod 33 is placed close to the rear edge of the bottom wall 31 and displaced to one side in the slot to such an extent that one side of the guide rod lies substantially in the symmetry axis of the share. By leading the tape out through the share along this side of the guide rod 33, the tape will be exactly in the centre of the slot opening provided; as a result the tape will, when the soil around it is pressed down, be exactly vertical. FIG. 5 is a part sectional side view of the same share clearly illustrating the special mounting of the guide rod 33. FIG. 3 thus illustrates that the ramparts 43, 44 pushed up by the lead-shares 23, 22 will remain without being pushed in, too, around the tape by the pressure wheels 15, 16, and as a result a certain shelter is afforded for the transplanted tender plants.

FIGS. 6 and 7 are a top view and a side view, respectively, of an alterative embodiment of the share 1 with the guide member 33, the same reference numbers being used for the same parts as in FIGS. 1-5. The guide member 33 of FIGS. 6 and 7 here consists of an approximately centrally located plate with an inclined upwardly and forwardly projecting front edge, and in which the carrying member 24 is fastened to the rearmost area of this plate in stead of as in FIGS. 1-5 to one of the side walls of the share. As clearly illustrated by FIG. 6 the rearmost end of the bottom wall 31 and of the lower parts of the side walls 29, 30 is cut off obliquely thus obtaining a particularly quick covering of the plants with soil pouring in from the sides, and a quick and reliable covering of the tape is thus ensured. The elevational location of the tape in the soil is thus controlled by changing the angle, under which the tape 27 descends around the front edge of the guide member 33.

FIGS. 8 and 9 are a side view, in which the front side wall has been omitted, and a top view, respectively, of a further embodiment of the share 1 with the guide member 33. The guide member 33 is here fastened on a separate slide 45 located on top of the bottom wall 31 and pre-stressed in forward direction (to the left in FIGS. 8 and 9) towards the mounting rod 2 by means of a spring 46. The slide 45 comprises a longitudinal guideway 47, through which a pair of guide pins 48 has been led; said guide pins have been screwed into the bottom wall 31 and project above the top side of the slide 45, and their heads 49 extend beyond the lateral edges of the guideway of 47. On the top side of the bottom wall 31 a number of knobs or beads 50 is located, on which the slide 45 rests, and which reduce the resistance against the movement of the slide 45 across the bottom wall 31. During operation the plant tape 27 (cf. FIG. 5) surrounds the guide member 33 and pulls said guide member in inclined backward direction (to the right in FIGS. 8 and 9) orthogonal to the longitudinal axis of the guide member 33. When the pull in the guide member exceeds a certain size determined by the spring power and the frictional resistance towards the movement of the slide, the guide member 33 and the slide 45 will be pulled backwards to some extent by the tape, until equilibrium has been established between the tension from the tape and the said powers. When the tension in the tape 27 again drops, the spring 46 will again pull the slide 45 forward (towards the left in FIGS. 8 and 9). During these movements the slide 45 is guided in lateral direction and is being kept down by the guide pins 48 comprising the heads 49. The variations in tension in the tape can be equalized completely or partially by means of the resiliently suspended slide 45 with the guide member 33.

Figure 10:
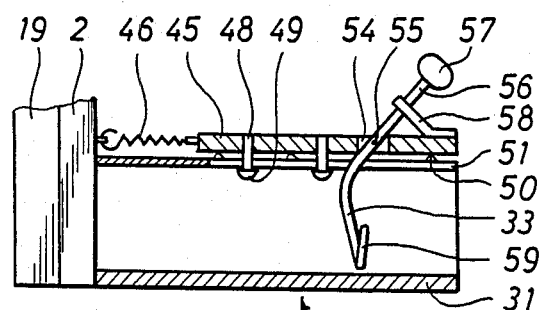
Figure 11:
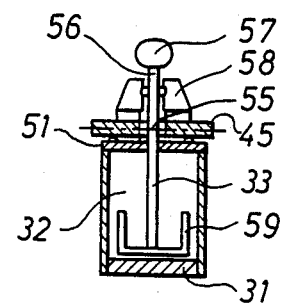

FIGS. 10-13 illustrate another embodiment of the share 1 with the guide member 33 mounted on a slide 45, and are a part-sectional side view with the front side wall omitted and a part-sectional rear view as well as a top view with and without, respectively, the slide 45 with the guide member 33 mounted thereon. In this embodiment the share 1 is partly closed on the top side by means of a top wall 51, in which a longitudinal guideway 52 has been established, which opens funnel-shaped towards the rear edge 53 of the share 1. The slide 45 is located on top of the top wall 51 above friction-reducing knobs or beads 50 mounted thereon. Guide pins 48 having corbelled heads 49 are mounted in the slide 45 hanging down therefrom through the guideway 52 in the top wall 51. As to dimensions and position the guide pins 48 match the guideway 52 in such a manner that the slide 45 is longitudinally displaceable in relation to the share 1 and guided in lateral direction and retained in upward direction. Furthermore, a transverse pivot 55 is fastened in a recess 54 in the slide 45. The guide member 33 and a control rod 56 rigidly connected therewith and having a handle 57 are suspended on said pivot in such a manner that the guide member 33 projects down into the interior of the share through the guideway 52 and may be tilted backwards and upwards or forwards and downwards in a vertical plane around the pivot 55 by operating the control rod 56. Locking means 58, e.g. a ball catch, are furthermore mounted on the slide, said locking means being capable of locking the control rod and the guide member in its front position (as illustrated in FIG. 10). At the lower free end of the guide member 33 a substantially U-shaped stop member 59 is mounted capable of preventing the tape from sliding past the lower free end of the guide member 33, as particularly illustrated by FIG. 11.

Figure 12:
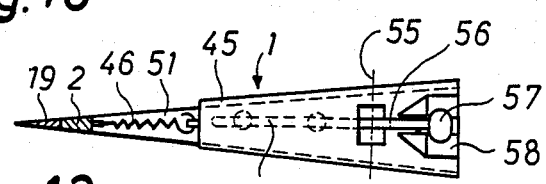
Figure 13:
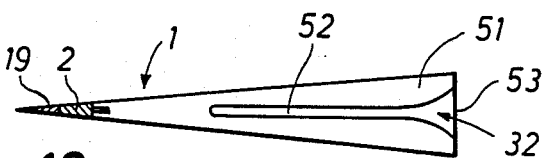

Again, a spring 46 is located between the slide 45 and the mounting rod as in the embodiment illustrated in FIGS. 8 and 9. Said spring pre-stresses the slide 45 in forward direction towards the mounting rod 2 (towards the left side in FIG. 10). FIG. 13 is a top view of the share with no slide 45 and no guide member 33 mounted thereon, whereas FIG. 12 is a top view of the share with the slide 45 and the guide member 33 mounted thereon. The mounting of the slide 45 is here quite simply effected by the slide being pushed into the guideway 52 together with the guide pins 48 and the guide member 33, whereafter the spring is fastened. When a plant tape is to be placed around the guide member 33 (as illustrated in FIG. 5), the guide member 33 is tilted backwards by tilting the control rod forwards, and the guide member 33 will consequently be easily accessibly located behind the side walls of the share. It will thus be easy to place the tape around said guide member 33, whereafter the guide member again is tilted forward in the position illustrated in FIG. 10 and is locked. The effect of this sprung guide member during operation is as described above in connection with FIGS. 8 and 9, thus also here rendering an equilization of the variations of tension in the tape during operation possible.

In a further embodiment of the special share the guide member 33 is composed of the rearmost part of one of the side walls, which is then slotted obliquely upward and forward, the rearmost end of the side wall simultaneously being pulled a small distance towards the centre of the slot.

As it is apparent, especially on the basis of FIG. 2 of the drawing, the apparatus according to the invention has a very limited width leaving enough room for a large number of apparatuses arranged in side by side relation behind a tension bar of a normal width, and simultaneous transplanting of a large number of rows by means of only one tractor and one operator is thus made possible

I claim:

1. A transplanting apparatus for planting a tape which contains live plant stems, said stems placed perpendicular to the length of the tape, said tape formed into a roll, and said roll including means for mounting the roll on said apparatus for paying out of the tape, the apparatus comprising:

a frame having a front end and a rear end; means pivotally mounting said front end to a tool bar;

a V-shaped soil opener;

means adjustably mounting said soil opener vertically relative to said frame;

a pair of pressure wheels;

means mounting said pressure wheels to a central portion of said frame rearwardly of said soil opener, with one wheel of said pair angled downwardly toward the soil disturbed by each respective side of said soil opener;

a freely rotatable turntable;

means fixedly mounting said rotatable turntable at a preselected angle relative to said soil opener and rearwardly of said pressure wheels;

a tape direction reversing means having a top portion and a bottom portion; and means mounting said tape direction reversing means at a preselected angle within said soil opener with the top portion forward relative to said bottom portion, whereby a roll of tape can be mounted on said turntable, with an end of the tape threaded around said tape direction reversing means and into soil compressed by the pressure wheels to anchor said tape thereby to allow the tape to be drawn from the roll as the tool bar is moved over the soil.

* * * * *